Figure 11:
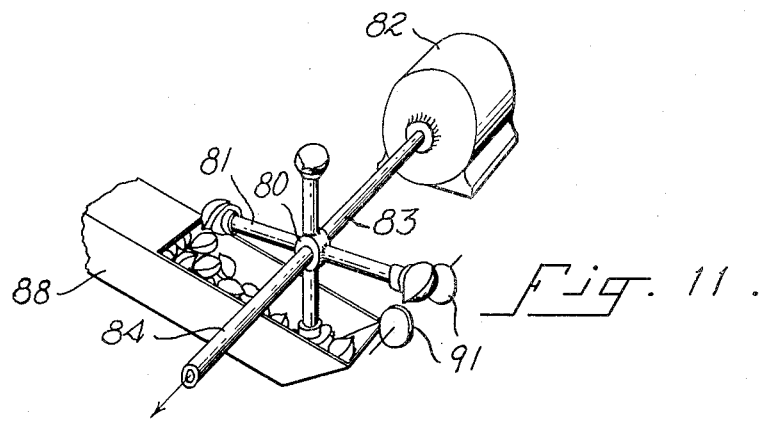

Dec. 8, 1953          F. O. McMILLAN          2,661,784
MIETHOD AND APPARATUS FOR SHELLING NUTS
Filed July 21, 1950                              4 Sheets-Sheet 1
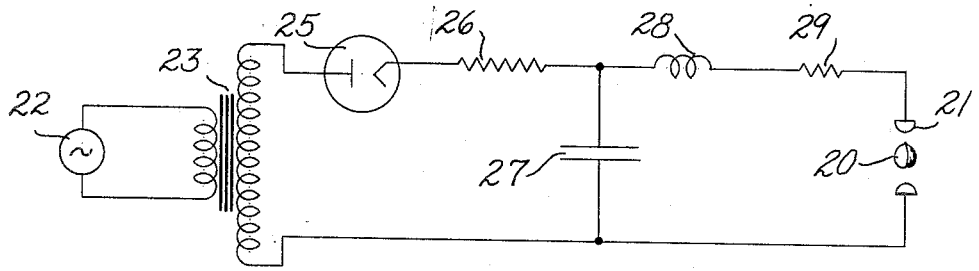
Fig. 1.
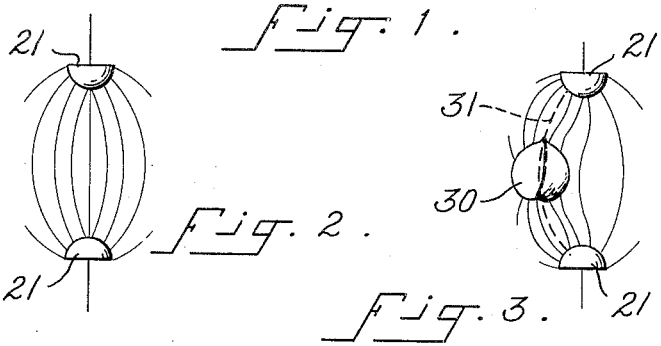
Fig. 2.    Fig. 3.
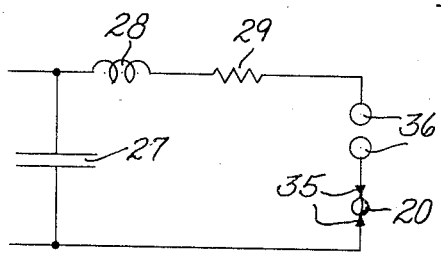    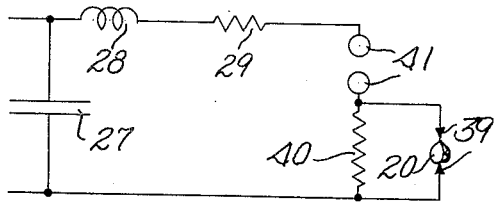
Fig. 4.    Fig. 5.
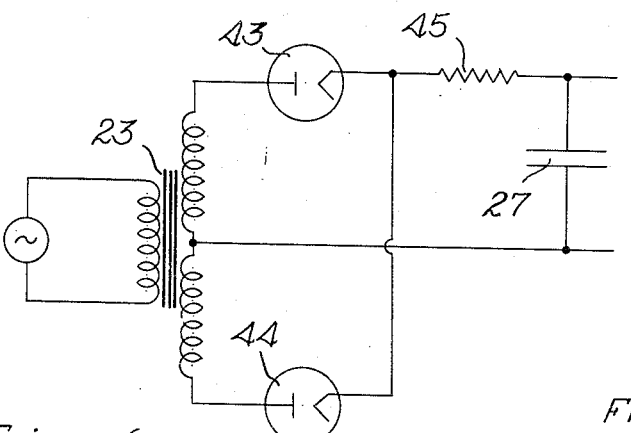
Fig. 6.
INVENTOR.
Fred O. McMillan
BY
Buckham and Cheatham
Attorneys Dec. 8, 1953  F. O. McMILLAN  2,661,784
METHOD AND APPARATUS FOR SHELLING NUTS
Filed July 21, 1950  4 Sheets-Sheet 2
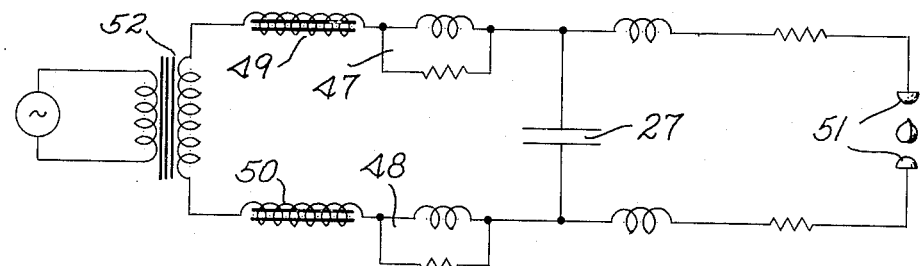
Fig. 7.
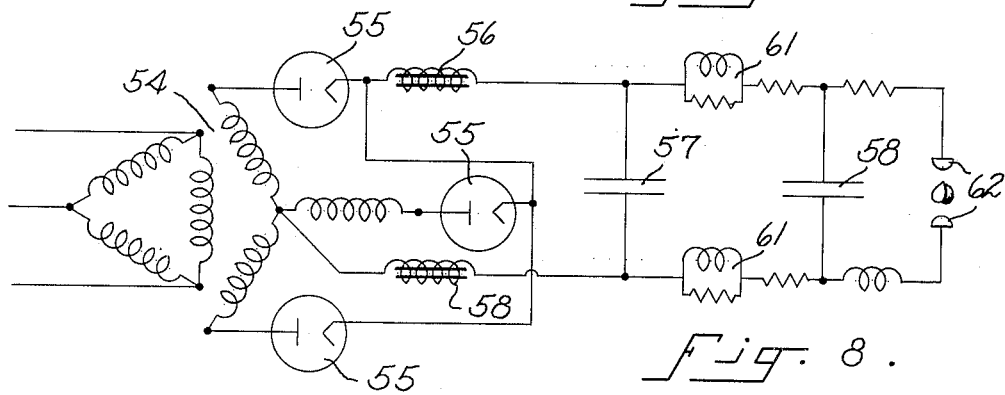
Fig. 8.
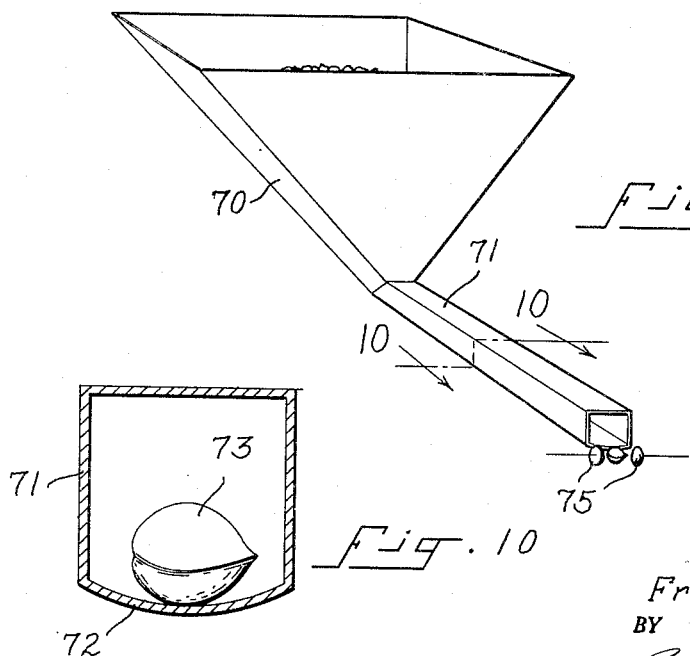
Fig. 9.
Fig. 10.
INVENTOR.
Fred O. McMillan
BY
Burcham and Cheatham
Attorneys Dec. 8, 1953 F. O. McMILLAN 2,661,784
METHOD AND APPARATUS FOR SHELLING NUTS
Filed July 21, 1950 4 Sheets-Sheet 3

INVENTOR.
Fred O. McMillan
BY
Buckhorn and Cheatham
Attorneys

Dec. 8, 1953     F. O. McMILLAN     2,661,784
METHOD AND APPARATUS FOR SHELLING NUTS
Filed July 21, 1950     4 Sheets-Sheet 4
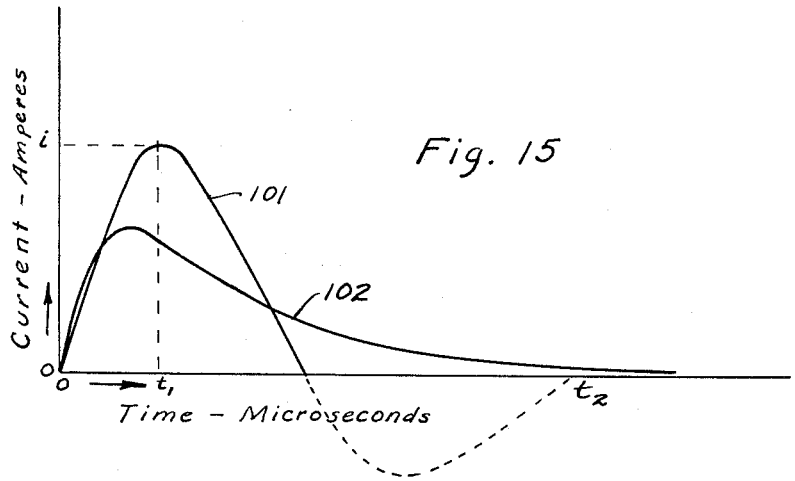
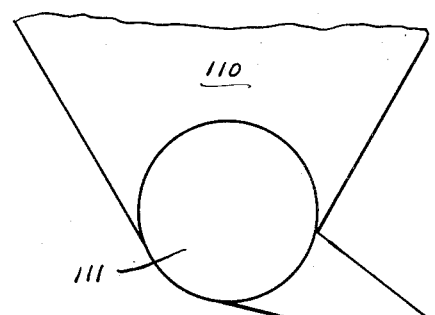
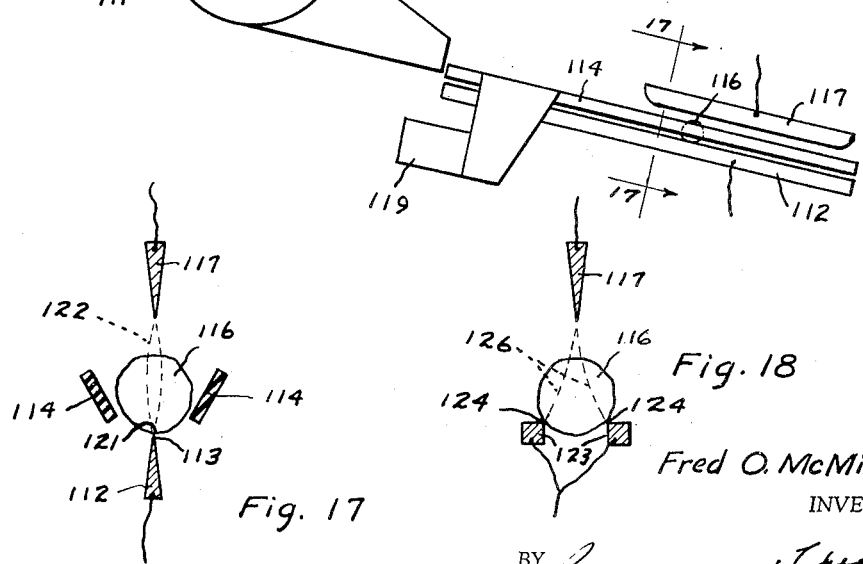
Fred O. McMillan
INVENTOR.

Patented Dec. 8, 1953

2,661,784

UNITED STATES PATENT OFFICE 2,661,784

METHOD AND APPARATUS FOR SHELLING NUTS

Fred O. McMillan, Corvallis, Oreg.

Application July 21, 1950, Serial No. 175,270

19 Claims. (Cl. 146—227)

The present invention relates to methods and apparatus for treating nuts, and more particularly to methods and apparatus useful in the separation of shells from the nut meats.

This application is a continuation-in-part of my application Serial No. 31,620, filed June 8, 1948 which is now abandoned.

Prior to the present invention, the shells of nuts have normally been cracked by mechanical means and the particles of the shell separated from the nut meat by hand picking, screening, blowing, flotation, or other mechanical means. These are tedious processes and unsatisfactory for numerous reasons. Mechanical cracking of the nuts results in a substantial breakage of the nut meat, and it is extremely difficult to separate the small nut meat particles from the shell fragments. In order to minimize damage to the nut meat, the shell is purposely incompletely broken with the result that much of the nut meat is left pocketed within cavities of the larger shell pieces and which must be picked out by hand. Also mechanical cracking tends to wedge portions of the nut meat tightly into the shell cavities rendering more difficult the matter of extraction of such portions.

It has been proposed to shell nuts by means of high pressure gas introduced into the shell for the purpose of shattering the shell by high internal pressure. It has also been proposed to inject explosive gas into the shell and to ignite the same either by a flame or by an electric spark and thereby explode the shell. Such processes involve relatively complicated and expensive machinery and are generally unsatisfactory because of the problems of handling the gas and the injection thereof into the shell.

As distinguished from the above processes, I have discovered that nuts can be shelled solely by subjecting the natural, untreated nuts to a substantially instantaneous high-voltage, high-current electrical impulse discharge and, as a result of which, the shell is substantially entirely shattered into relatively small fragments while the nut meat itself remains substantially undamaged. Occasionally, the nut meat is broken into two or three pieces, but these are, nonetheless, of large size so that the nut meat can readily be separated from the shell particles by a simple screening operation.

It is, therefore, a general object of the present invention to provide a new and improved method of shelling nuts electrically. More specifically, it is an object of the present invention to provide a method of shelling nuts by means of substantially instantaneous high-voltage, high-current, electrical discharges.

A still further object of the invention is to provide a new and improved apparatus for shelling nuts electrically.

A further object of the present invention is to provide a new and improved apparatus for feeding nuts to an electric shelling arrangement.

For a consideration of what is believed novel and inventive, attention is directed to the following description taken in connection with the accompanying drawings while the features of novelty will be pointed out with greater particularity in the appended claims.

In accordance with my present invention, I pass natural, untreated nuts between a pair of electrodes and simultaneously subject them to a substantially instantaneous high-voltage, high-current electrical impulse discharge. By the term, natural, untreated nuts is meant nuts in their natural condition which have not been given any preparatory treatment except such drying as may be necessary to prevent spoilage while being handled or stored, though drying is not essential insofar as the present invention is concerned. A portion of the discharge will take place within the shell of the nut and, as a result thereof, a relatively great pressure will be created within the nut substantially instantaneously and which results in shattering of the shell.

The high internal gas pressure created by the electric discharge is the result of various phenomena. There is a considerable volume of gas and vapor inherently present within a natural, untreated nut, between the nut meat and the shell and which is acted upon by the electric discharge passing through the nut. It will be understood that gases in accordance with the kinetic theory are considered to be made up of minute, perfectly elastic particles which are constantly moving about with high velocities, colliding with each other and with the walls of the containing vessel. The pressure exerted by a gas is due to the impact of the moving particles upon the walls of the containing vessel, the magnitude of the pressure being dependent upon the kinetic energy of the particles and their number. Upon the occurrence of the electric discharge within the nut shell, kinetic energy is added to the gas and vapor and additional gases and vapors are liberated from the shell and kernel and, also, certain gas or vapor molecules are ionized, the combinations of which effects increases greatly the kinetic energies of the gas and vapor particles within the shell as well as their number.

The ionization of the gases within the shell which increases the total number of gas particles will be due to both radiation absorption and electron bombardment, though some ionization may result from the rapid movement of positive ions in the intense electric fields employed and from the high temperature of the electric discharge. The increase in pressure created within the shell as the result of the electric discharge passed therethrough is of such magnitude and takes place with such rapidity that the restraining shell is blown outwardly with explosive violence and is substantially fragmented. The kernel of the nut, which exerts little or no restraining force, suffers slight, if any, damage. Of further practical importance is the fact that the shell fragments are forcefully blown away from the vicinity of the electrodes while only slight, if any, impelling force is given to the kernel.

The amount of energy released and the rate at which it is released by the electric discharge within the shell of the nut being cracked can be accurately controlled within wide limits by the character of the electric power supply, the magnitude of the voltage employed, the resistance, inductance, and capacitance of the circuit used to apply the electric impulses.

The electrodes used for applying the electric discharges to the nuts may be made in any of a wide range of shapes ranging from sharp points to flat planes of limited area. However, the preferred electrode shapes are those which will concentrate a high dielectric flux density and consequently a high voltage gradient in the region occupied by the nut being cracked and that have a relatively very short time-lag in breakdown at the time of the electric discharge. A gap with a short time-lag characteristic is obtained with blunt or shielded electrodes that are essentially free from ionization or corona when voltage is applied and increased until a critical voltage gradient is reached at which ionization suddenly occurs and progresses completely across the gap between electrodes resulting in complete breakdown and electric discharge without further increase in the applied voltage. Electrodes having these short time-lag characteristics are those which have spherical, hemispherical, and other smooth, blunt facing surfaces. The gap spacings at which these electrodes will give the desired short time-lag characteristics are from very short spacings up to values approximately equal to the electrode diameter. Therefore the size of the electrodes should be made large enough to have the required characteristics at the maximum discharge gap used.

There are a considerable number of circuits which may be employed for producing the high voltage impulses supplied to the electrodes. The most satisfactory, however, are those which incorporate a capacitor and which is charged from the power supply at a relatively slow rate and subsequently suddenly discharged as the voltage charge on the capacitor exceeds the critical breakdown voltage of the electrode gap. The instant of discharge can be timed with the positioning of the nut between the electrodes, or the circuit can be either so arranged or adjusted that the positioning of the nut between the electrodes will automatically result in breakdown of the electrode gap.

Figure 12:
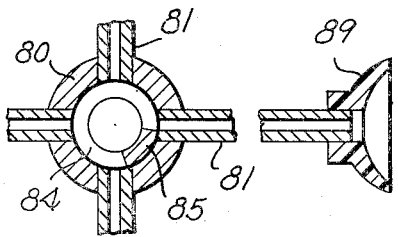
Figure 13:
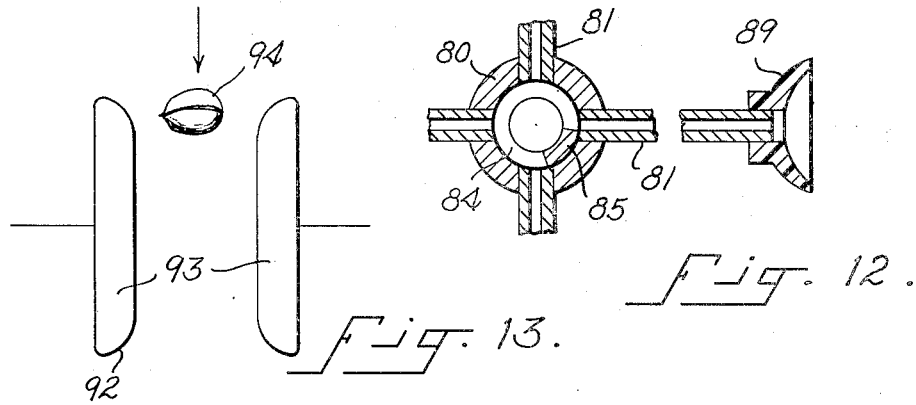
Figure 14:
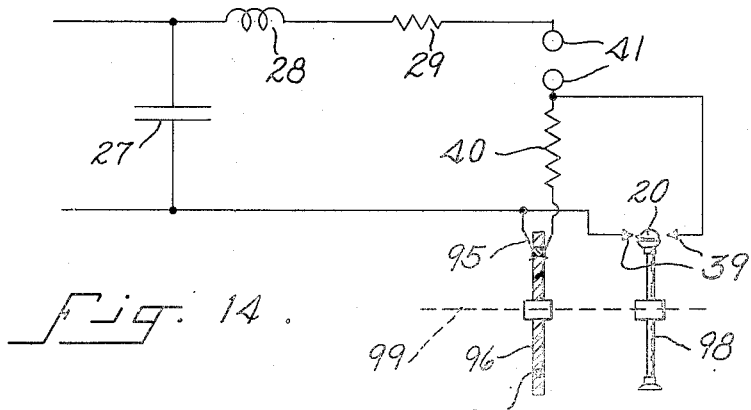

In the drawings, Fig. 1 is a schematic diagram illustrating a simplified form of high voltage impulse discharge circuit; Fig. 2 is an explanatory schematic diagram illustrating the dielectric flux field between a pair of gap electrodes in air; Fig. 3 is an explanatory schematic diagram illustrating the dielectric flux field with a nut positioned between the electrodes; Fig. 4 is a schematic diagram illustrating a second modification of a discharge circuit for an impulse capacitor; Fig. 5 is a schematic diagram illustrating a further modification of the discharge circuit for an impulse capacitor; Fig. 6 is a schematic circuit diagram illustrating a further modification of a charging arrangement for an impulse capacitor; Fig. 7 is a schematic diagram illustrating another modification of a high voltage impulse discharge circuit arrangement; Fig. 8 is a schematic circuit diagram illustrating a still further modification of a high voltage impulse discharge apparatus; Fig. 9 is a diagrammatic view in perspective illustrating a nut feeding arrangement; Fig. 10 is a cross-sectional view taken along the line 10—10 of Fig. 9; Fig. 11 is a diagrammatic view in perspective illustrating a still further form of a nut feeding arrangement; Fig. 12 is a fragmentary view in cross section illustrating certain details of the apparatus shown in Fig. 11; Fig. 13 is a view illustrating a modified discharge electrode arrangement; Fig. 14 is a schematic diagram illustrating a synchronous switch incorporated in an impulse capacitor discharge circuit; Fig. 15 is a diagrammatic curve illustrating certain characteristics of impulse current discharges inherent with the circuits of Figs. 1, 4, 5, 6, 7, 8 and 14; Fig. 16 is a schematic view illustrating a further modification of a nut feeding and shattering arrangement; Fig. 17 is a cross-sectional view taken along line 17—17 of Fig. 16; and Fig. 18 is a cross-sectional view illustrating an alternative electrode arrangement.

Referring now to Fig. 1, one form of apparatus is illustrated diagrammatically which may be utilized for creating high voltage and high current electrical discharges for cracking nuts. A nut is shown at 20 positioned between a pair of electrodes 21 which are spaced apart a distance substantially greater than the maximum dimension of the nut. Power is supplied from any suitable voltage source such as an alternating current source 22, which is connected to the primary of a high voltage transformer 23. The secondary voltage of the transformer 23 may be adjusted in accordance with the type, size and spacing of the electrodes 21 by any suitable voltage regulating means (not shown) in the transformer primary circuit. One terminal of the transformer secondary is shown connected to a half-way rectifier 25, such as a kenotron tube, the output terminal of the rectifier being connected through a protective resistance 26 to one terminal of the capacitor 27. The opposite terminal of the capacitor 27 is connected to the second terminal of the transformer secondary winding. The electrodes 21 are connected across the terminals of the capacitor 27, an inductor 28 and resistor 29 being connected in series circuit relation with the electrodes. The inductor 28 represents the inherent inductance of the series circuit together with such additional inductance as may be provided for controlling the shape of the impulse wave supplied to the electrodes. The resistance 29 is provided for limiting the current discharge in the gap circuit to a safe value as determined by the current limitations for the capacitor 27.

In the operation of this circuit, the capacitor 27 is first charged with direct current energy through the rectifier 25, the charging rate being controlled by the value of the resistance 26. Due to the rounded surface configuration of the electrodes 21, their separation and spacing with respect to the nut 20, as shown, no discharge in the form of corona will take place on the surfaces thereof prior to the time that the voltage charge built up in the capacitor 27 approaches the critical breakdown voltage for the electrode gap. As soon as the breakdown voltage for the electrode gap is reached, a discharge will take place between the electrodes. The discharge, in passing through the nut, will substantially instantaneously increase the internal pressure against the nut shell to effect shattering thereof as explained above.

Any suitable means, such as will be described hereinafter, may be employed for feeding or positioning successive nuts between the electrodes 21 in timed relation with respect to the charging or discharge rate of the capacitor 27 so that the discharge will occur simultaneously with the positioning of the nut 20 between the electrodes 21. It is to be understood that the positioning of the nut between the electrodes 21 is not critical for the reason that there will be a normal tendency for the discharge to take place between the electrodes through the nut since it will offer a path of less resistance for the discharge even though it is not placed directly in alignment between the electrodes. With reference to Fig. 2, it is pointed out that, in the case of hemispherical electrodes as indicated in Fig. 1, the dielectric lines of force between the electrodes 21 extend normally from the surface of the electrodes at any given point and follow a curvilinear path toward the opposite electrode. Since the potential gradient at the electrode surface is greatest between the points of closest proximity, the force lines will be concentrated to a greater degree at the center of the dielectric field than toward the fringe areas and with only air between the electrodes, the discharge will take place generally along the shortest path. If a nut is introduced into the area between the electrodes as indicated, for example, in Fig. 3 at 30, the flux field pattern illustrated in Fig. 2 will be altered to the extent that the dielectric constant of the nut is greater than that of air and increases the flux density in the path through the nut. The discharge will, therefore, take place along the line of greatest flux density through the nut and along some such line as indicated by the dotted line 31. It follows, therefore, that the nut need be positioned only approximately between the electrodes 21 in order to insure passage of the discharge therethrough. Thus, in speaking of passing or placing a nut "between" the electrodes, the term as used in the present specification and claims includes the positioning of a nut in a sufficiently contiguous relation to a pair of discharge electrodes as to provide a path of lesser dielectric strength therebetween than the dielectric strength of the air gap between the electrodes.

It will be obvious to those skilled in the art that it is not essential that the condenser 27 be charged with a voltage corresponding to the air breakdown voltage of the electrode gap. In the case of a basic circuit arrangement as shown in Fig. 1, it will be sufficient, and it will generally be desirable, to charge the capacitor 27 with a potential slightly less than the breakdown voltage for the electrodes. As will be observed with reference to Fig. 3, the dielectric strength of the gap is less with the nut therein than with the nut removed. So long as the capacitor is charged with a potential greater than the critical breakdown voltage for the gap with the nut therebetween, the capacitor will automatically discharge across the electrodes immediately upon movement of the nut therebetween. The nut, itself, therefore serves as a trigger for the gap discharge and substantially irrespective of the speed with which the nut may be moved between the electrodes.

In the case of hemispherical electrodes of, for example, 6 cm. in diameter, the critical breakdown voltage for spacing of 6 cm. will be of the order of 100 kv. With a nut 4 cm. in length, for example, positioned therebetween, the critical breakdown voltage for the gap is reduced to between 50 and 70 kv. so it will be obvious, therefore, that the capacitor 27 may be charged to a sufficiently high potential with a transformer secondary voltage of the order of 50 to 75 kv. maximum while the capacitor, itself, may have a capacitance of the order of 0.125 mf. to 0.250 mf. The value of the resistance 26 may, for example, be of the order of from 75,000 to 1,000,000 ohms depending upon the rating of the transformer, the current rating of the rectifier, and the charging time desired for capacitor 27. The value of the resistance 29 is determined by the maximum discharge current rating of the capacitor 27 and should be kept as low as is safe in order that the discharge current will be as high as possible. This resistance may, for example, be of the order of 5 ohms in the circuit described. The total inductance of the discharge circuit and represented by the inductor 28 may be, for example, of the order of $2 \times 10^{-5}$ henry. Under such circuit conditions, the discharge current will be of the order of 10,000 amperes. It will be apparent to those skilled in the art that the values for the various circuit elements may be varied within wide limits, and those given are merely set forth for purposes of illustration.

It will readily be understood by one skilled in the art that, in the case of an apparatus as illustrated in Fig. 1, the potential to which the capacitor 27 must be charged is determined by the gap spacing and which need be merely so great that nuts may be readily passed therebetween. Obviously, the capacitor 27 cannot be charged to a potential greater than the critical breakdown voltage of the gap. While a current value of the gap discharge of the order of 10,000 amperes has been found suitable for use in effecting a complete shattering of walnut shells, it will be recognized that this value is by no means critical and may be varied widely. Obviously, less energy will be required to shatter soft shelled nuts, such as peanuts, than will be required for hard shelled nuts, such as black walnuts. The circuit constants may be selected so as to provide a current value for the discharge producing the most satisfactory results for any given type or nature of nut. In general, however, peak current values for the discharge impulse of the order of at least many hundreds of amperes will be found desirable.

As is well known by those skilled in the art, the impulse discharge which will occur across the electrodes 21 of the circuit illustrated in Fig. 1 is characterized by a very steep wave front such as may be illustrated by curve 101 in Fig. 15 in which current is plotted in amperes, the peak $i$ being of the order of many hundreds, or even thousands, of amperes, and time is plotted in microseconds, the total elapsed time required for the current to reach maximum value, or $T_1$, being of the order of one or two microseconds in the case of a capacitor 27 of 0.125 mf. and approximately three microseconds for a capacitor value of 0.250 mf. In the preferred, low resistance circuit, the discharge transient will have an oscillatory characteristic, but whether the discharge transient is of an oscillatory or non-oscillatory nature is immaterial for present purposes. By increasing the circuit resistance, represented by resistor 29, the discharge transient may be altered from the oscillatory to the non-oscillatory or damped condition as may be illustrated by the dotted curve 102 in Fig. 15. For the critically damped condition, with a capacitance rating of 0.250 mf., the resistance of the discharge circuit should be of the order of 17.9 ohms. Due to the higher value of circuit resistance in such case the crest value of the current impulse wave would be materially less than in the former case as indicated by the relative magnitudes of the two curves 101 and 102. This, of course, represents a material decrease in the efficiency of the discharge circuit insofar as present purposes are concerned. In order to increase the maximum value of the discharge current to a level comparable to that for the oscillatory condition, the size of the capacitor 27 may be correspondingly increased.

As previously mentioned, the efficacy of the method and apparatus of the present invention is dependent upon the sudden application of energy to the nuts being treated or, in other words, that the elapsed time required for the discharge current to reach peak value be short. The exact time required for the current to reach maximum value is not critical and may be lengthened considerably though with progressively decreasing circuit efficiency. In the specific example given, the inductance of the discharge circuit represented by the inductor 28 is purposely made relatively low in order to provide a steep front for the discharge wave. By increasing the value of the inductance 28 to 346 microhenries the time required for the discharge current to reach maximum value would be approximately 10 microseconds as compared with approximately two microseconds for the circuit first considered. By increasing the inductance further to 33,000 microhenries, approximately 100 microseconds would be required for the current discharge to reach maximum value.

In the case of a nonoscillatory circuit condition and with a capacitor 27 of 0.125 mf., a circuit resistance 29 of 160 ohms, and an inductance 28 of 800 microhenries will produce a current crest at about 10 microseconds. With a resistance of 1600 ohms and an inductance of 80,000 microhenries the crest may be further prolonged to 100 microseconds. Such periods of elapsed time, as 10, or 100 microseconds, or even longer, may be satisfactory for cracking certain types of nuts depending upon various factors such as brittleness and porosity of the shell. If the energy is imparted too slowly to the nut, the pressure may be diffused through the pores of the nut shell without effecting the desired degree of shattering. By increasing the magnitude of the current through the use of increased capacitance 27, complete shattering of nut shells may be effected even with relatively long, sloping current wave shapes but the power consumption is correspondingly increased tending to reduce the overall efficiency of the system.

It will be obvious, therefore, that the steeper the wave front, or in other words, the shorter the time lag for the current discharge wave to reach maximum value, the lower will be the current, and hence power, requirements. While a current value of several hundred amperes at one or two microseconds might be sufficient to completely shatter a given nut, a current value of the order of 20,000 amperes might be required to shatter the same nut at 100 microseconds. It is to be understood that insofar as the present invention is concerned even a 100 microsecond wave front may be considered as steep as compared with a common 60 cycle sine wave, in which case approximately 4,200 microseconds are required for the current wave to increase from zero to maximum value. A 60 cycle wave front would, of course, be ineffective for cracking nuts according to the present invention.

The present invention, therefore, is characterized by the fact that shattering of the nut shell is accomplished by subjecting the nut to a current impulse discharge of at least several hundred amperes for relatively soft shelled nuts to several thousand amperes for harder shelled nuts. By the term substantially instantaneously applied impulse discharge is meant a current wave which increases from zero to maximum value substantially instantaneously, that is, preferably at the rate of at least several hundred amperes per microsecond.

The circuit arrangement shown in Fig. 4 is substantially the same as that shown in Fig. 1 except that, in this case, the nut 29 is shown positioned between a pair of electrodes 35 which are in series with a second pair of spaced apart electrodes 36. The electrodes 35, in this case, may be of any configuration, that is, without regard to corona formation and are illustrated merely as a matter of convenience as being pointed while the gap electrodes 36 are of a corona free type such as of spherical configuration. The breakdown voltage for the discharge circuit is, of course, determined by the combined spaces between the pairs of electrodes 35 and 36, but no current will flow in the circuit discharging the condenser 27 until the gap 36 breaks down. The gap 36 may, therefore, be termed a trigger gap for initiating a sudden discharge of the condenser 27 through the nut. In the modification of Fig. 4, it will be noted that the energy stored in the capacitor 27 is divided between the gaps 36 and 35 so that, in order to effect cracking of the nut 29, the charge of the capacitor 27 would have to be somewhat higher than in the case of the circuit arrangement shown in Fig. 1.

In the further modification illustrated in Fig. 5, the nut 29 is shown betwen a pair of electrodes 39 and which are connected across a resistor 40 arranged in series with the voltage control gap electrodes 41. The resistor 40, in this instance, may be, for example, of the order of 5,000 ohms and shunts the pair of electrodes 39 and applies essentially the full voltage of condenser 27 across the control gap electrodes 41. In the arrangement shown in Fig. 5, the charge for the condenser 27 is determined solely by the gap electrodes 41. Immediately upon breakdown of the gap of electrodes 41, the entire voltage is impressed across the resistor 40 and, since the discharge voltage of the gap 41 is substantially greater than the discharge voltage of the gap electrodes 39, breakdown of the gap of the electrodes 41 will be immediately followed by breakdown of the gap of the electrodes 39, and the resultant discharge occurring between the latter electrodes will effect shattering of the shell of the nut as previously described. Since no discharge will occur across the gap of the electrodes 39 prior to the breakdown of the gap 41, it is immaterial what configuration is given to the electrodes 39 insofar as corona formation is concerned. The discharge of capacitor 27, after passing across the control gap electrodes 41, branches and a small part of the energy is converted into heat in resistor 40 while the greater part is dissipated in the nut and gap between electrodes 39. The proportion of the energy converted into heat in resistance 40 can be reduced to a minimum by making the value of resistance 40 large.

In the modification of Fig. 1, provision is made for only half-wave rectification for the charging of the capacitor 27. More efficient utilization of power can be effected with a full-wave rectification and the previously described circuit may be modified to provide for full-wave rectification as illustrated in Fig. 6. In this instance, one of the terminals of the condenser 27 is conected to the midpoint of the secondary winding of the transformer 23 while the outer terminals of the transformer secondary are connected to separate corresponding rectifier tubes 43 and 44, the output terminals of which are connected together and to the opposite terminal of the condenser 27 through the protective resistor 45.

In the modification of Fig. 7, the condenser 27 is connected for charging with an alternating current voltage, the opposite terminals of the condenser 27 being connected through wave traps 47 and 48 and inductances 49 and 50 to the opposite terminals of the secondary winding of the transformer 52. The discharge loop circuit for the gap electrodes 51 is, in this instance, shown in the simplified form corresponding to that of Fig. 1, it being understood, however, that the discharge circuit for the condenser 27 may be of the type illustrated in either Figs. 4 or 5 if desired. The secondary voltage of the transformer 52 must, in this case, be somewhat higher than the breakdown voltage for the electrode gap 51 while the condenser 27 is successively charged and discharged during each half wave of the applied potential. The inductances 49 and 50 are provided for the purpose of preventing impulse currents returning to the transformer winding upon the discharge of the condenser 27 while the wave traps 47 and 48 each consisting of a relatively small inductor with a paralleling resistance are provided for flattening out the steep fronts and dissipating a part of the energy in the current waves reflected upon the windings of the inductors 49 and 50.

In the event that the power supply to the transformer 52 of Fig. 7 is 60-cycle, the capacitor 27 will be charged at the rate of 120 times per second. The nuts may be fed between the electrodes in synchronism with the power supply so that the discharge will occur simultaneously with positioning of the nuts between the electrodes. This is easy of accomplishment merely by driving the feeding means with a synchronous motor. Alternatively, the nuts may be passed more slowly between the gap electrodes, or the electrodes may be of longitudinal configuration in the direction of the path of travel of the nuts so that each nut will be subjected to a plurality of discharges in the event that complete shattering did not result from the first discharge therethrough.

In the circuit arrangement illustrated in Fig. 8, a three-phase alternating current power supply is illustrated in the form of a deltawye connected transformer 54 with a rectifier 55 connected in series with each of the legs of the transformer secondary, the output terminals of the rectifier being all connected together and through a protective inductance 56 to one terminal of a storage capacitor 57. The other terminal of the capacitor 57 is connected through a protective inductance 58 to the neutral terminal of the transformer secondary. An impulse capacitor 59 is connected in parallel with the storage capacitor 57 with current limiting resistors 60 and wave traps 61 connected between each pair of terminals of the capacitors 59 and 57. A discharging circuit is provided for the impulse capacitor 59 including a pair of gap electrodes 62 similar to the discharging circuit shown in Fig. 1 but which may be substituted by the discharge circuits illustrated in Figs. 4 or 5 if desired. The advantage of employing a storage capacitor 57 ahead of the impulse capacitor 59 lies in the fact that the charging time for the impulse capacitor 59 may be substantially reduced inasmuch as the storage capacitor 57 may be charging during the interim that the capacitor 59 is discharging through the gap electrodes 62, it being understood that discharging of the storage capacitor 57 through the electrode gap is precluded by the resistors 60 provided between the capacitors 59 and 57. Moreover the voltage drop occurring across the resistors 60 is sufficiently great so that the discharge arc across the electrode gap is extinguished imediately upon discharge of the capacitor 59.

Considering specifically the case of walnuts, the shell consists of two halves which are joined together along adjacent edges extending lengthwise of the nut. The dielectric strength of the shell is weakest along the juncture of the shell halves and particularly in the direction longitudinally of the nut. It is desirable, therefore, to feed the nut between the electrodes with the longitudinal axis of the nut parallel and, preferably, in alignment with the common axis of the electrodes. Various means may be provided by one skilled in the art for feeding nuts in such a manner between the electrodes, and several modifications are disclosed.

Referring now to the drawing of Fig. 9, a hopper is shown at 70 having side walls converging downwardly toward a discharge opening at the lower end. A chute 71 sloping downwardly at an angle of, for example, 15° communicates with the discharge opening of the hopper 70. Any suitable means (not shown) may be provided for insuring free flow of the nuts into the chute. As illustrated in the detail view of Fig. 10, the bottom wall 72 of the chute 70 is curved slightly in the transverse direction and the upper surface is suitably roughened or coated to insure rolling movement of the nuts. Walnuts as well as most other types of nuts are generally of an elongated shape and, due to this elongation, in rolling down a sloping surface they will tend to roll about their smaller diameter as indicated at 73 in Fig. 10. A pair of electrical discharge electrodes 75 may be mounted adjacent the discharge end of the chute 71 so that the nuts rolling from the chute 71 will pass between the electrodes 75 in approximately the properly aligned relation therewith. It will be obvious, that at least that part of the chute next adjacent the electrodes 75 should be of noncurrent conductive material.

The nuts, in falling freely between the electrodes, may automatically initiate the electrical discharge between the electrodes or the discharge may be otherwise controlled so as to take place at the instant of positioning of the nut between the electrodes, and which, for reasons as previously explained, will take place through the nut itself and result in shattering thereof.

Referring now to Fig. 11, a further feeding means is shown comprising a rotatable hub 80 having a number of hollow arms 81 extending radially therefrom. The hub 80 is mounted on a shaft 83 direct-coupled to the motor 82. A hollow shaft 84 coupled to a vacuum pump (not shown) extends stationarily into the hub 80 and is provided with a valve land 85 on one side thereof (see Fig. 12) severing communication between the vacuum pump and the hollow arms 81 at one point in the revolution of the hub. The arms 81 rotate through a tray 86 kept filled with nuts by gravity feed from a hopper (not shown) and one nut is picked up by suction with the soft plastic cup 89 fixed on the end of each arm at each turn of the hub. The nut is carried between a pair of electrodes 91 mounted adjacent each of the opposite sides of the path of travel of the nuts and beyond the end of the tray 88. The cups 89 are oblong in shape with the long dimension extending parallel with the axis of rotation so that the nuts will seat therein and be carried lengthwise parallel with the axis of the electrodes. Suction will be cut off from the arms, as each one passes from between the electrodes 91, by the valve land 85. Any suitable baffle means (not shown) may be provided to keep the shell fragments from being blown into the tray 88.

The motor 82 may be of the synchronous type in case the nuts are required to be fed between the electrodes 91 at a predetermined fixed rate and interval, or of any other suitable type, in the event that the discharges between the electrodes are initiated by the nuts themselves. On the other hand, a simple switching arrangement mechanically coupled to the nut feeding means may be provided for controlling the capacitor discharge circuit. As shown schematically in the diagram of Fig. 14, a capacitor discharge circuit is shown similar to that of Fig. 5. In this modification, a switch 95 is provided in series circuit with the resistor 40, the switch including a rotating element such as a disc 96 of insulating material provided with spaced apart electrically conductive inserts 97 adjacent its peripheral portion for establishing conductive connection between the opposed brushes of switch 95. The disc 96 may be mechanically coupled to the nut feeding means 98 which may, for example, be of the type illustrated in Fig. 11, and in which case the number and spacing of the conductive inserts 97 correspond with the number and spacing of the nut positioning elements of the feeding means 98. In the drawing, the disc 96 and nut feeding means 98 are indicated as being mounted on a common shaft represented by the dotted line 99. With such a switch arrangement, closure of the discharge circuit and discharging of the capacitor 27 may be accurately controlled mechanically so that the discharges across the electrodes 39 will occur simultaneously with the positioning of the nut therebetween.

As previously mentioned, the discharge electrodes between which the nuts are cracked may be of any desired shape and surface configuration except where they are connected in a circuit such as shown in Fig. 1, for example, where the capacitor potential is at all times impressed upon the electrodes. In such case, the facing surfaces of the electrodes should be smooth and with the edges rounded so as to minimize the formation of corona upon the electrode surfaces prior to the instant of complete breakdown. It will be recognized by those skilled in the art that, if the electrodes connected in a discharge circuit as shown in Fig. 1 are provided with sharp points or edges on their adjacent surfaces, corona discharge will take place considerably in advance of the breakdown voltage. The corona discharge will increase progressively in extent across the electrode gap as the critical voltage is reached so that the total period of energy dissipation is spread over a considerable period of time. It will be understood that the shells of nuts are relatively porous and, if the kinetic energy is supplied gradually to the gases thereof, the gas will escape from the shell and pressure sufficient to break the shell might never be developed. It is important in all modifications of the invention that the discharge through the nut be substantially instantaneous so that the internal pressure be developed substantially instantaneously and which will result in the shattering of the shell before any leakage of pressure can occur through the walls of the shell substantially irrespective of the degree of porosity thereof.

In Fig. 13 is shown a pair of electrodes 93 which are elongated in the direction of the path of travel of the nut 94 which is passed therebetween. The nut 94 may be either dropped or shot between the electrodes at a relatively high rate of speed but, because of the length of the electrodes, the timing of the discharge with respect to the positioning of the nut therebetween will be relatively simple. On the other hand, with a capacitor 27 having a fast charging rate, as in the case of Fig. 8, the nut may even be subjected to a plurality of discharges during the interval of time it is between the electrodes. By suitable adjustment of the discharge potential, the discharges can be made to occur automatically by the presence of the whole nut between the electrodes and which will automatically be discontinued as soon as the nut has been shattered. It will be noted that the outer edges of the electrodes 93 are rounded as indicated at 92 for reasons explained above. In the case of the modifications shown in Figs. 4 and 5 where the discharge of the impulse capacitor is controlled by a separate set of gap electrodes, the nut cracking electrodes may be of any shape without regard to surface configuration since no corona of any consequence will form on the adjacent surfaces in advance of a breakdown of the control gap. Moreover the nut cracker electrodes may engage directly with the opposite sides or opposite ends of the nut if desired.

In the arrangement illustrated in Figs. 16 and 17, nuts may be fed one at a time in rapid succession from the hopper 110, through suitable flow controlling means 111 arranged in the bottom of the hopper, into an inclined chute arrangement. The chute arrangement includes an elongated lower electrode 112 having a relatively sharp longitudinal upper edge 113, and a pair of spaced longitudinal guides 114 of suitable insulating material on each of the opposite sides of electrode 112 for guiding the nuts, such as 116, down the chute. A cooperating elongated electrode 117 is suspended by any suitable insulating means, not shown, above and in parallel alignment with the electrode 112 and spaced therefrom a suitable distance to permit free passage of nuts therebetween in going down the chute. The lower edge of the electrode 117 is sharp as in the case of the adjacent edge of electrode 112 in order to provide a high concentration of flux at such points. With the electrodes 112 and 117 connected to discharge circuits of the type shown in Figs. 4 and 5 in the manner of electrodes 35 or 39, discharge will occur between electrodes 112 and 117 upon passage of a nut 116 therebetween. Upon shattering of the nut, the pieces will be blown out of the chute by the force of the explosion or fall downwardly between the electrode 112 and the guide rails 114. A suitable vibrator unit 119 may be connected to the chute for vibrating the same to insure continuous movement of the nuts down the chute.

Because the nut in passing down the chute is at all times in direct contact with the sharp upper edge 113 of the lower electrode, a high concentration of flux is created on the inner surface of the nut shell opposite the point of contact, as indicated at 121, at the initiation of the discharge and which will be instrumental in causing the ensuing discharge to take place diametrically through the nut, as indicated by dotted line 122, rather than possibly taking place ineffectively along a creepage path on the outer surface of the shell. In the modification of Fig. 18, a chute is formed by two parallel, spaced apart rectangular electrode rods 123 so mounted that the nuts 116 will glide, or roll, therealong in contact with the two upper adjacent corners 124. In this case the flux from the lower electrodes at the initiation of a discharge will be divided between the two contact points and a forked discharge may take place through the nut as indicated by dotted lines 126. If desired, one of the rods 123 may be of insulating material in which case the flux will all be concentrated at the point of contact of the nut with the single electrode rod and a lined discharge will take place through the nut. With reference to Fig. 18, it will be observed that the electrical discharge path indicated by dotted lines 126 does not extend diametrically through the nut 116 but by the term "substantially diametrically" as used in the ensuing claims it is intended to include such a discharge path as is indicated by either or both of the dotted lines 126 in Fig. 18.

Having described the invention in what I consider to be preferred embodiments thereof, it will be understood that the specific details of the apparatus shown are merely illustrative, and that the invention may be carried out by various other means.

What I claim as my invention is:

1. The method of cracking nuts which consists of shattering the shell of nuts solely by passing substantially diametrically through the same a substantially instantaneous high voltage electrical impulse discharge with a current value of the order of at least many hundreds of amperes.

2. The method of cracking nuts which consists of suddenly expanding the naturally contained gas within a nut by subjecting the nut to a substantially instantaneous high voltage electrical impulse discharge with a current value of the order of at least many hundreds of amperes.

3. The method of cracking nuts which consists of substantially instantaneously expanding the gas within a natural untreated nut by subjecting the nut to a substantially instantaneous high current, high voltage electrical impulse discharge, said discharge being at a rate of the order of hundreds of amperes per micro-second.

4. The method of cracking nuts which comprises positioning a nut between a pair of substantially diametrically opposed electrodes, suddenly passing a high voltage and high current electrical impulse discharge substantially diametrically through said nut, the rate of said discharge being of the order of hundreds of amperes per micro-second whereby the natural gases within the shell of said nut will be suddenly expanded with explosive force and cause shattering of said shell.

5. The method of cracking nuts which comprises the steps of applying a high voltage across a pair of spaced apart electrodes without appreciable corona formation thereupon, the applied voltage being slightly less than the critical breakdown voltage for the gap space between said electrodes, passing a natural untreated nut between said electrodes whereby the resultant reduction in the dielectric strength of the electrode gap causes substantially instantaneous breakdown thereof with the electrical discharge passing through said nut and shattering the shell thereof.

6. The method of cracking nuts which comprises the steps of applying a high voltage charge across a pair of spaced apart electrodes, the applied voltage being slightly less than the critical voltage for the electrode gap space, passing a natural untreated nut between said electrodes whereby an electrical discharge takes place substantially instantaneously between said electrodes and passing through said nut.

7. The method of cracking nuts which consists of positioning a natural untreated nut between a pair of opposed electrodes and substantially instantaneously applying a high voltage impulse across said electrodes, the voltage being sufficiently high to cause breakdown of the electrode gap, the rate of the gap discharge being of the order of at least hundreds of amperes per microsecond, the electric discharge penetrating said shell and shattering the same.

8. In an apparatus for cracking nuts, the combination comprising a pair of electrodes, said electrodes being spaced apart a distance greater than the maximum diameter of the nuts to be cracked, means for positioning a nut between said spaced apart electrodes, a capacitor, discharge circuit means connecting the terminals of said capacitor to said electrodes, and power supply means for charging said capacitor to a voltage at least sufficient to cause discharge thereof across said electrodes with a nut positioned therebetween, said discharge circuit means having low inductance and resistance whereby the rate of current discharge of said capacitor across said electrodes will be of the order of hundreds of amperes per microsecond, said discharge normally extending substantially diametrically through the nut.

9. An apparatus for shelling nuts comprising a pair of electrodes, said electrodes being spaced apart a distance greater than the maximum diameter of the nuts to be shelled, means for passing nuts between said electrodes, a capacitor, power supply means connected to said capacitor for charging the same, and circuit means connecting said capacitor to said electrodes for discharging the same thereacross at a current value of the order of at least many hundreds of amperes whereby the shell of the nut positioned between said electrodes at the time of discharge will be shattered.

10. An apparatus for shelling nuts comprising a pair of electrodes, said electrodes being spaced apart a distance greater than the maximum diameter of the nuts to be shelled, means for passing nuts between said electrodes, a capacitor, power supply means connected to said capacitor for charging the same to a voltage slightly less than the air breakdown voltage of the electrode gap, and low time lag circuit means having low resistance and inductance connecting said capacitor to said electrodes for suddenly discharging the same thereacross upon passage of a nut between said electrodes at a current value of the order of at least many hundreds of amperes whereby the shell of the nut will be shattered by the discharge occurring between said electrodes substantially diametrically of the nut.

11. An apparatus for cracking nuts comprising a pair of spaced apart electrodes having a common axis, impulse voltage supply means connected to said electrodes for impressing an impulse voltage across said eelctrodes of a magnitude sufficient to cause a discharge thereacross having a current value of at least many hundreds of amperes, and means for passing nuts between said electrodes with their longest dimension extending in a direction parallel with the common axis of said electrodes.

12. An apparatus for cracking nuts comprising a pair of electrodes spaced apart to form a gap therebetween, an impulse voltage supply means connected to said electrodes for impressing an impulse voltage across said electrodes of a value greater than the critical breakdown value of the gap between said electrodes, circuit means having low resistance and inductance connected between said supply means and said electrodes for causing the current value of the discharge occurring between said electrodes to be of the order of at least many hundreds of amperes, and means for passing one nut at a time substantially through said gap between said electrodes concurrently with the discharge of said impulse voltage across said electrodes whereby the shell of the nut will be shattered by the discharge.

13. An apparatus for cracking nuts comprising a pair of electrodes, said electrodes being spaced apart a distance greater than the maximum diameter of the nuts to be cracked for receiving a nut therebetween, means for feeding nuts between said electrodes, and impulse voltage supply means connected to said electrodes for causing a high voltage discharge having a current value of at least many hundreds of amperes to take place between said electrodes and substantially diametrically through said nut for effecting shattering of the nut shell.

14. An apparatus for cracking nuts comprising a pair of electrodes, said electrodes being spaced apart a distance greater than the maximum diameter of the nuts for receiving a nut therebetween, means for positioning a nut between said electrodes, impulse voltage supply means connected to said electrodes for causing a high voltage discharge to occur between said electrodes and substantially diametrically through the nut therebetween, circuit means connected between said supply means and said electrodes for causing the current value of the discharge to be of the order of at least many hundreds of amperes whereby the nut shell will be shattered by the discharge.

15. An apparatus for cracking nuts comprising a pair of electrodes spaced apart a distance greater than the maximum diameter of the nuts to be cracked for receiving a nut therebetween, means for positioning a nut between said electrodes, an impulse voltage supply means, switch means for effectively connecting said supply means to said electrodes for causing an impulse voltage discharge to occur between said electrodes and substantially diametrically through the nut therebetween, circuit means having low inductance and resistance connected between said voltage supply means and said electrodes for causing the current value of said discharge to be of the order of at least many hundreds of amperes depending upon the strength of the nut shell whereby the nut shell will be shattered by said discharge.

16. In an apparatus for cracking nuts, the combination comprising a pair of electrodes, said electrodes being spaced apart a distance greater than the maximum diameter of the nuts to be cracked, means for passing nuts between said spaced apart electrodes, a high impulse voltage supply means, a low inductance and resistance circuit means connecting said supply means across said electrode means for causing a discharge of said supply means to occur across said electrode means at a rate of at least hundreds of amperes per microsecond, said electrode means being adapted for receiving nuts therebetween but with the nut closely adjacent one of said electrode means for promoting puncture of the shell by the discharge occurring substantially diametrically through the nut.

17. In apparatus for cracking nuts, the combination comprising a pair of electrodes, said electrodes being spaced apart a distance greater than the maximum diameter of the nuts to be cracked, an impulse voltage supply means connected to said electrodes for impressing a voltage across said gap slightly less than the critical breakdown value of the gap between the electrodes, means for feeding a nut sufficiently contiguous to said electrodes to provide a path of lesser dielectric strength therebetween than said gap whereby discharge of said electrodes will occur substantially diametrically through said nut, and discharge circuit means having low inductance and low resistance connected between said supply means and said electrodes for causing the current value of said discharge to be of the order of at least many hundreds of amperes per microsecond.

18. In apparatus for cracking nuts, the combination comprising a pair of electrodes, said electrodes being spaced apart a distance greater than the maximum diameter of the nuts to be cracked, a capacitor, means connecting the opposite terminals of said capacitor to said electrodes, power supply means for charging said capacitor to a voltage slightly less than the air breakdown voltage of the electrode gap, and means for feeding a nut sufficiently contiguous to said electrodes to provide a path of lesser dielectric strength therebetween than said gap whereby an impulse discharge between said electrodes will occur substantially diametrically through said nut.

19. In an apparatus for cracking nuts, the combination comprising a pair of electrodes spaced apart a distance greater than the maximum diameter of the nuts to be cracked, means for passing nuts between said spaced apart electrodes, impulse voltage supply means, low inductance and low resistance circuit means connecting said supply means across said spaced electrode means for causing discharge of said supply means across said spaced electrodes upon passage of a nut between said electrodes and at a rate of the order of hundreds of amperes per microsecond, whereby said discharge will occur substantially diametrically through the nut.

FRED O. McMILLAN.

References Cited in the file of this patent

UNITED STATES PATENTS

| Number | Name | Date |
|---|---|---|
| 1,250,140 | Chapman | Dec. 18, 1917 |
| 2,200,405 | Watson | May 14, 1940 |
| 2,248,368 | Low | July 8, 1941 |
| 2,308,860 | Clark | Jan. 19, 1943 |
| 2,318,265 | Stogmeier | May 4, 1943 |
| 2,365,576 | Meaker | Dec. 19, 1944 |
| 2,400,113 | Haine | May 14, 1946 |
| 2,534,362 | Mognuson | Dec. 19, 1950 |